United States Patent [19]

Dreher et al.

[11] 4,250,942
[45] Feb. 17, 1981

[54] CLUTCH MECHANISM

[75] Inventors: Heinz W. Dreher, Box 109, S-782 00 Malung, Sweden; Bo S. O. Persson, Bräkne-Hoby, Sweden

[73] Assignee: Heinz Walter Dreher, Sweden

[21] Appl. No.: 921,104

[22] Filed: Jun. 30, 1978

[30] Foreign Application Priority Data

Jun. 30, 1977 [SE] Sweden .................. 7707590

[51] Int. Cl.$^3$ ............................................ E06B 9/208
[52] U.S. Cl. .................. 160/297; 160/323 R
[58] Field of Search .......... 160/297, 323–326; 403/165, 324, 378

[56] References Cited

U.S. PATENT DOCUMENTS

| 736,424 | 8/1903 | Mumbrauer | 160/297 |
| 1,008,748 | 11/1911 | Snavely | 160/297 |
| 1,134,727 | 4/1915 | Carmany | 160/297 |
| 3,552,775 | 1/1971 | Warner | 403/378 |
| 4,009,745 | 3/1977 | Erpenbeck | 160/297 |

FOREIGN PATENT DOCUMENTS

| 2308777 | 11/1976 | France | 160/297 |
| 7216867 | 6/1977 | Sweden | 160/297 |

Primary Examiner—Peter M. Caun
Attorney, Agent, or Firm—Young & Thompson

[57] ABSTRACT

A ball clutch mechanism in a spring motor for a tubular roller-blind rod or the like. The clutch includes a hub or outer clutch member rotatably mounted on a cylindrical portion of a shaft made of plastics and forming an inner clutch member including clutch ball receiving recesses. The hub has straight ball channels and is made of plastics in one piece. The hub is locked in an axial position on the shaft by a locking pin engaging a groove in the shaft. The locking pin has a stop arm located to retain the respective clutch ball in the ball channel.

1 Claim, 12 Drawing Figures

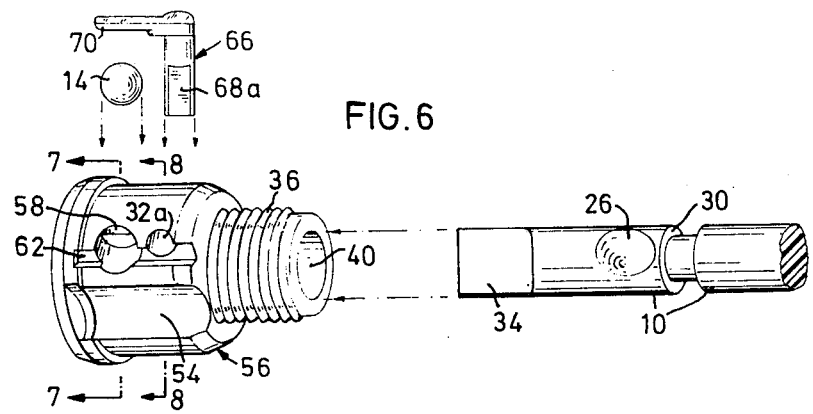
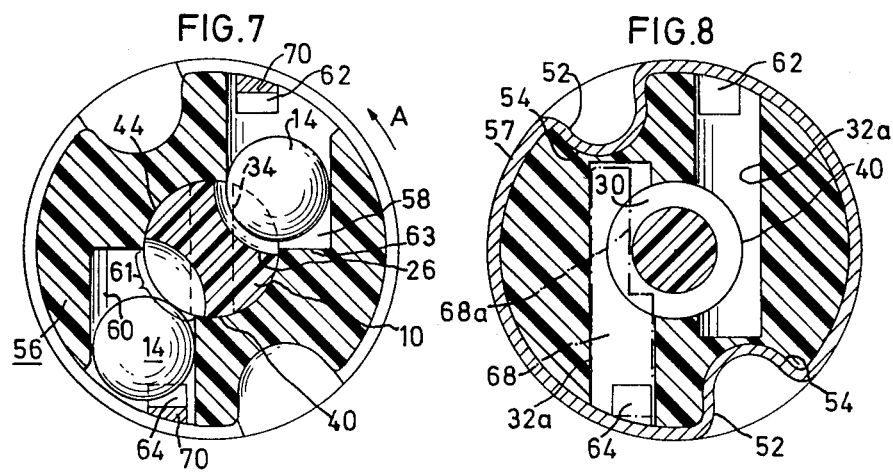
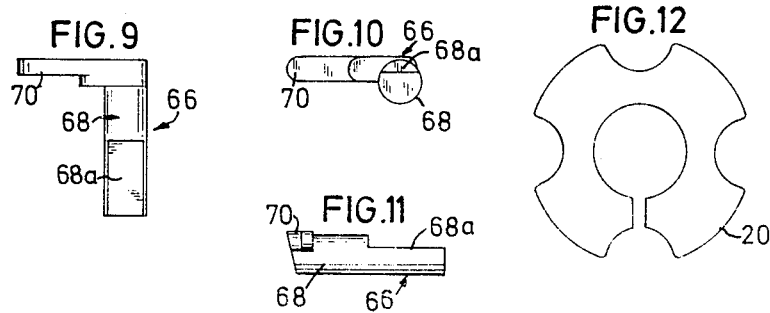

CLUTCH MECHANISM

The present invention relates to a clutch mechanism in a spring motor for a tubular roller-blind rod or the like, comprising a ball clutch having a hub or outer clutch member to be secured non-rotationally in one end of the tube. The hub has a number of channels for clutch balls adapted, upon predetermined driving conditions, to engage a ball-receiving recess in an inner clutch member which at one end has a coaxial outer non-cylindrical journal pin to be held rotationally stationary upon use. The inner clutch member is non-rotationally connected at its other end with a coaxial shaft surrounded by a helical torsion motor spring having one end secured to the shaft and its other end secured to the hub, so that rotation of the rod in the rolling-off direction in relation to the stationary inner clutch member will occur against the action of the spring.

Mechanism of this or similar character are known from Swedish Pat. No. 7216867-7 and U.S. Pat. Nos. 1,134,727 and 4,009,745.

Particularly U.S. Pat. No. 4,009,745 discloses such a mechanism having several of its parts made of plastics to enable mass production at low cost. However, the ball channels have such a configuration that they must be located between two pieces to be connected, and furthermore, the inner clutch member must be connected to the shaft by means of a coupling.

The object of the present invention is therefore to provide a mechanism of the kind under consideration, which has a less number of separate details and is easier to assemble and disassemble, than the mechanisms hitherto known.

These and other objects may be obtained with a mechanism which, according to the invention, has the features set forth in the annexed claims.

The shaft including its portion forming the inner clutch member and the journal pin is made in one piece from plastics such as nylon. This new design enables the hub to be inserted over the journal pin to its position on the shaft where the hub is connected with the spring. The axial position of the hub is simply locked by means of a locking pin engaging a groove in the shaft. Preferably, the locking pin has a stop arm which extends into the adjacent ball channel in the hub and retains the ball therein. The ball channels are in contrast to prior art shaped as straight channels, which makes it possible to mould the hub and its internal ball channels in one piece, thus simplifying the manufacture and assembly work.

The above and other details and advantages, which characterise the invention, are explained in more detail below. Reference is made to two embodiments of the mechanism according to the invention shown as examples in the accompanying drawings.

FIG. 6 is a diagrammatic perspective view of a preferred embodiment of a hub having two ball channels, and of the shaft end poetion for receiving the hub;

FIG. 7 is a cross section through the hub along line 7—7 in FIG. 6 at the position of the ball channels;

FIG. 8 is a cross section of the hub along line 8—8 in FIG. 6 at the position of the transverse locking pin channels;

FIGS. 9 to 11 are different views of a locking pin having a stop arm; and

FIG. 12 is a plan view of a shaft-supporting disc.

Figure 1:
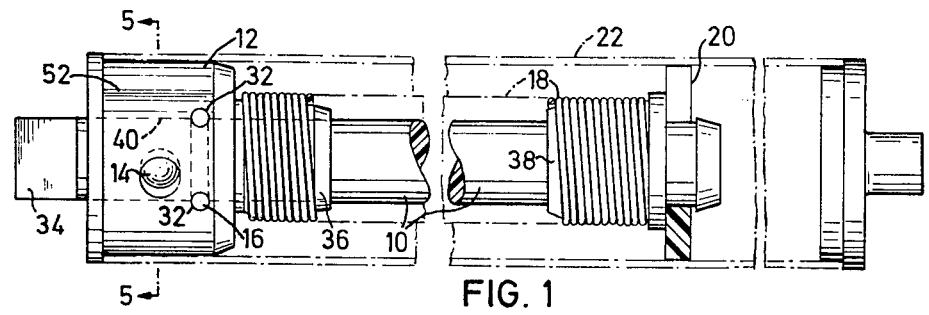
FIG. 1 is a side view of a mechanism according to the invention mounted in a tubular roller-blind rod.
Figure 2:
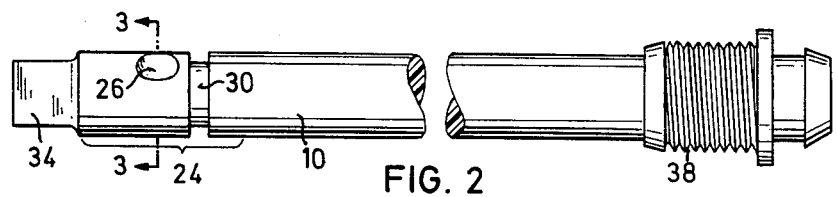
FIG. 2 is a separate view of the shaft included in the mechanism in FIG. 1.
Figure 3:
FIG. 3 is a section along line 3—3 in FIG. 2.
Figure 4:
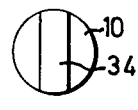
FIG. 4 is an end view of the shaft in FIG. 2 and shows the journal pin of the shaft.

The embodiment shown in FIGS. 1 to 5 comprises a cylindrical rod 10 of plastic such as nylon, a hub 12 of plastics such as nylon, a number of clutch balls 14 in metal, a locking pin 16, a helical torsion spring 18 of metal, and a shaft-supporting disc 20 of plastics. As shown in FIG. 1, these details form a unit which has been inserted into a metal tube 22 indicated by dotted lines in FIG. 1 and forming the roller-blind rod, the hub 12 being held in place by frictional engagement with the tube 22.

An axial cylindrical portion 24 of the shaft 10 forms an inner clutch member having two ball-receiving recesses 26,28 and an annular groove 30 for receiving a portion of the pin 16 which has been inserted in one of the transverse pin channels 32. The hub 12 is thus rotationally mounted on the shaft portion 24 and is held in a predetermined axial position by the locking pin 16 engaging the groove 30.

The outer end of the shaft is shaped to a non-cylindrical journal pin 34 to be non-rotationally supported by a support (not shown) in a conventional manner.

The hub 12 functions as an outer clutch member and has a tubular extension 36 with threads engaged by one end of the spring 18. The other end of the spring engages a threaded portion 38 at the other end of the shaft.

The hub 12 has a bore 40 enabling the hub to be inserted over the journal pin 34 to its operating position in FIG. 1.

Figure 5:
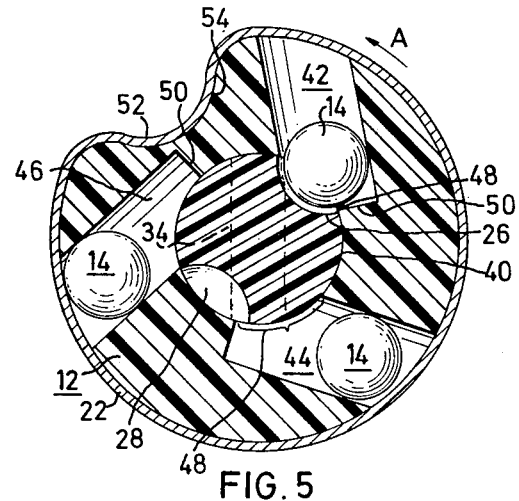
FIG. 5 is a cross section along line 5—5 in FIG. 1 through the hub attached to the tube.

As shown in FIG. 5, the hub 12 has three straight ball channels 42,44,46 which are identical and symmetrically disposed in a radial plane. For the sake of simplicity only one of the channels, channel 42, will be described in its position relative to the upper recess 26.

The channel 42 extends from the outer circumference of the hub 12 and is closed by the wall of the tube 22. As will be seen from FIG. 5, the direction of channel 42 is non-radical and the bore 40 of the hub partially crosses the inner end of the ball channel 42 so as to cut away a corner portion thereby to leave an opening 48 for permitting a portion of the ball 14 to enter the recess 26.

As may be approximately estimated from FIG. 5, the centre line of the ball channel 42 has such a position that it substantially coincides with a plane tangent to the cylindrical bore 40. The bottom 50 of the channel 42 is substantially flat and at right angles to the length of the channel and is in a plane crossing the cylindrical bore in a region where the centre line of the channel is substantially tangent to the bore of the hub.

As will be seen from FIG. 5, the straight ball channels enable the hub to be moulded in plastics, and furthermore, the balls will follow a straight path between their clutch position and neutral position. This straight path minimises the distance for the ball to travel and thus enables a rapid engagement or disengagement, respectively.

The tube 22 has a furrow 52 engaging a corresponding groove 54 in the hub 12. This furrow is intended to receive the reinforced end edge of the roller-blind. The bottom of the furrow 52 extends radially inwardly far enough to retain the spring 18 in engagement with the extension 36.

The embodiment in FIG. 5 is preferably used for hubs 12 having a diameter which is greater than for normal roller-blind rods, whereas the embodiment in FIGS. 6 to 9 of the hub is used for hubs with a diameter which is smaller than or normal for roller-blind rods.

In FIGS. 6 to 12 the same reference numerals are used as in FIGS. 1 to 5 for the same details, the basic differences being with respect to the hub 56 and the tube 57.

The tube 57 is shown in cross section in FIG. 8 and has two furrows 52, and the hub 56 has two corresponding grooves 54.

As shown in FIG. 7, the hub 56 has two ball channels 58, 60 which are parallel with each other and extend into the hub from opposite sides thereof and leave openings 61 for the balls, as openings 48 in FIG. 5. The tool for injection moulding of plastics can accordingly be made of two identical halves, so that the tool cost will be relatively low. The position of the channels 58,60 and their bottoms 63 are substantially the same as in FIG. 5 with respect to the recess 26 and the bore 40 of the hub.

As shown in FIGS. 6, 7 and 8 the hub has two axial grooves 62,64 which extend over the ends of the ball channels 58,60.

The transverse pin channels 32a for two locking pins 66, as shown in detail in FIGS. 9 to 11, have their outer ends in the grooves 62,64.

Each locking pin 66 comprises a cylindrical pin 68 which fits in the pin channel 32a, as indicated by dotted lines in FIG. 8. The inner portion 68a of the pin 68 has a reduced thickness to fit in the groove 30 of the shaft 10.

The outer end of the pin 68 is formed integral with a stop arm 70 at right angles to the pin 68.

The stop arm 70 fits into the groove 62 or 64, when the pin 68 is pressed into its locking position in the channel 32a. Accordingly, the locking pin 66, as shown in FIG. 9, will serve two purposes, namely securing the hub 56 in axial position on the shaft 10 and forming a stop at the outer end of the respective ball channel to retain the ball in the channel.

When the pin 34, and thus the shaft 10, is held against rotation, actuation of the hub in FIGS. 5 and 7 for rotation in the direction of arrow A is prevented by the clutch ball engaging the recess, whereas the hub is free to rotate in the opposite direction.

What we claim is:

1. A clutch mechanism in a spring motor for a tubular roller-blind rod or the like, comprising a ball clutch having a hub or outer clutch member to be secured non-rotationally in one end of the tube and provided with a number of channels for clutch balls adapted, upon predetermined driving conditions, to engage a ball-receiving recess in an inner clutch member which at one end has a coaxial outer non-cylindrical journal pin to be held rotationally stationary upon use, the inner clutch member being non-rotationally connected at its other end with a coaxial shaft surrounded by a helical torsion motor spring having one end secured to the shaft and its other end secured to the hub, so that rotation of the rod in the rolling-off direction in relation to the stationary inner clutch member will occur against the action of the spring, characterised in that the shaft (10) and the journal pin (34) are an integral one-piece member of plastics such as nylon, that the inner clutch member comprises a cylindrical portion (24) of the shaft and is provided with said recess (26,28), that the hub (12,56) is made in one piece of plastics such as nylon and has a cylindrical bore (40) enabling the hub to be inserted over the journal pin (34) to its operating position on said shaft portion (24), that said shaft portion (24) has an annular groove (30) receiving a portion of a locking pin (16,66a) inserted into the hub in a transverse pin channel (32,32a), and that the hub has a number of straight ball channels (42,44,46;58,60) extending in a radial plane from the outer circumference of the hub in a non-radial direction and so that the bore (40) of the hub will partially cross the inner end of each ball channel and cut away a corner portion to leave an opening (48;61) for admitting a portion of the ball in the respective channel to enter said recess (26), the locking pin (66) being at its outer end extended with a stop arm (70) at right angles to the locking pin and located in an axial groove (62,64) in the outer surface of the hub, said stop arm crossing the opening formed by the outer end of the adjacent ball channel (58,60) so that the stop arm will retain the ball in the channel when the hub is not mounted in a roller tube.

* * * * *